US011925964B2

(12) United States Patent
Pilgrim

(10) Patent No.: US 11,925,964 B2
(45) Date of Patent: Mar. 12, 2024

(54) TEMPERATURE RESISTANT DEVICE USED TO ASSIST IN REMOVAL OF CANNABIS CONCENTRATE RECLAIM

(71) Applicant: Joshua D. Pilgrim, Flagstaff, AZ (US)

(72) Inventor: Joshua D. Pilgrim, Flagstaff, AZ (US)

( * ) Notice: Subject to any disclaimer, the term of this patent is extended or adjusted under 35 U.S.C. 154(b) by 298 days.

(21) Appl. No.: 17/390,952

(22) Filed: Jul. 31, 2021

(65) Prior Publication Data

US 2023/0030996 A1 Feb. 2, 2023

(51) Int. Cl.
*A24F 9/04* (2006.01)
*B08B 7/00* (2006.01)
*B08B 11/02* (2006.01)

(52) U.S. Cl.
CPC .............. *B08B 7/0071* (2013.01); *A24F 9/04* (2013.01); *B08B 11/02* (2013.01)

(58) Field of Classification Search
CPC .......................................................... A24F 9/04
See application file for complete search history.

(56) References Cited

U.S. PATENT DOCUMENTS 10,350,655 B2 * 7/2019 Miranda ............... B08B 9/0321
10,721,961 B2 * 7/2020 Aladin ...................... A24F 1/30

OTHER PUBLICATIONS

Can I put my rig in the oven to get the reclaim, user PineTreePetey, r/Dabs, Reddit, https://www.reddit.com/r/Dabs/comments/bdof0m/can_i_put_my_rig_in_the_oven_to_get_the_reclaim/ (Year: 2019).*

* cited by examiner

*Primary Examiner* — Russell E Sparks
(74) *Attorney, Agent, or Firm* — Dana Legal Services; Jubin Dana

(57) ABSTRACT

In accordance with various embodiments and aspects of the invention, an apparatus is disclosed that allows removal of reclaim from a cannabis consumption device. After placing the cannabis consumption device in the apparatus, the apparatus is placed in an oven. The heat from the oven liquefies the reclaim and the reclaim drains into the apparatus. According to one or more embodiments, the apparatus has a base with clips for an oven rack, a wedge to aid in the apparatus not tipping, a brace that connects the base to the back, a notch in the brace to retain a cannabis consumption device, and a shelf with one or more tubes that allow the reclaim to drain into a containment tray. According to one or more embodiments, one or more of the tubes may have a taper.

16 Claims, 9 Drawing Sheets

TEMPERATURE RESISTANT DEVICE USED TO ASSIST IN REMOVAL OF CANNABIS CONCENTRATE RECLAIM

FIELD OF THE INVENTION

The present technology is in the field of high temperature tolerant apparatus and, more specifically, related to an apparatus that is placed in high temperature environments in order to capture the removal of cannabis concentrate reclaim present in a cannabis consumption utensil.

BACKGROUND

While consuming cannabis (e.g., concentrate and extract), a cannabis consumption utensil may have buildup formed in the utensil as part of the consumption process. This buildup may be known as "reclaim". As reclaim may contain reusable cannabis, there is a desire to remove the reclaim from the utensil. Furthermore, as the reclaim loses efficacy over time, there is the need for frequent removal of reclaim.

One method of removing buildup from a utensil involves using isopropyl alcohol rinses. In addition to being a time-consuming evaporation process, the resulting reclaim may not be reusable for re-consumption through traditional inhalation forms. Another method of removing reclaim from a cannabis consumption utensil is to use a torch or similar direct flame heat source to heat the cannabis consumption utensil. Potential problems with using a torch include destroying reclaim by poor temperature control (e.g., overheating reclaim), a broken apparatus (e.g., user mishandles utensil), and burns to a user performing the reclaim method. Therefore, what is needed is an apparatus to remove reclaim from a cannabis consumption utensil.

SUMMARY OF THE INVENTION

In accordance with various embodiments and aspects of the invention, an apparatus is disclosed that allows removal of reclaim from a cannabis consumption utensil. After placing the cannabis consumption device in the apparatus, the apparatus is placed in an oven. The heat from the oven liquefies the reclaim and the reclaim drains into the apparatus. According to one or more embodiments of the invention, the apparatus is placed in the oven and then the cannabis consumption utensil is placed in the apparatus.

According to one or more embodiments of the invention, the apparatus has a base with clips for an oven rack, a wedge to aid in the apparatus not tipping, a brace that connects the base to the back, a notch in the brace to retain a cannabis consumption device, and a shelf with one or more tubes that allow the reclaim to drain into a containment tray. According to one or more embodiments of the invention, one or more of the tubes may have a taper. According to one or more embodiments of the invention, one or more of the tubes may be straight. According to one or more embodiments of the invention, the base may have a counterweight hole that accommodate a counterweight and/or another accessory mount point.

According to one or more embodiments of the invention, an upper accessory can be attached to the back of the apparatus to provide additional support of a cannabis consumption device. The upper accessory has one or more arms to hold a cannabis consumption device. According to one or more embodiments of the invention, the upper accessory one or more arms may be flexible to allow the user to adjust the upper accessory to a specific cannabis consumption device.

BRIEF DESCRIPTION OF THE DRAWINGS

In order to understand the invention more fully, reference is made to the accompanying drawings. The invention is described in accordance with the aspects and embodiments in the following description with reference to the drawings or figures (FIG.), in which like numbers represent the same or similar elements. Understanding that these drawings are not to be considered limitations in the scope of the invention, the presently described aspects and embodiments and the presently understood best mode of the invention are described with additional detail through use of the accompanying drawings.

DETAILED DESCRIPTION

The following describes various examples of the present technology that illustrate various aspects and embodiments of the invention. Generally, examples can use the described aspects in any combination. All statements herein reciting principles, aspects, and embodiments as well as specific examples thereof, are intended to encompass both structural and functional equivalents thereof. The examples provided are intended as non-limiting examples. Additionally, it is intended that such equivalents include both currently known equivalents and equivalents developed in the future, i.e., any elements developed that perform the same function, regardless of structure.

It is noted that, as used herein, the singular forms “a,” “an” and “the” include plural referents unless the context clearly dictates otherwise. Reference throughout this specification to “one embodiment,” “an embodiment,” “certain embodiment,” “various embodiments,” or similar language means that a particular aspect, feature, structure, or characteristic described in connection with the embodiment is included in at least one embodiment of the invention.

Thus, appearances of the phrases “in one embodiment,” “in at least one embodiment,” “in an embodiment,” “in certain embodiments,” and similar language throughout this specification may, but do not necessarily, all refer to the same embodiment or similar embodiments. Furthermore, aspects and embodiments of the invention described herein are merely exemplary, and should not be construed as limiting of the scope or spirit of the invention as appreciated by those of ordinary skill in the art. The disclosed invention is effectively made or used in any embodiment that includes any novel aspect described herein. All statements herein reciting principles, aspects, and embodiments of the invention are intended to encompass both structural and functional equivalents thereof. It is intended that such equivalents include both currently known equivalents and equivalents developed in the future. Furthermore, to the extent that the terms “including”, “includes”, “having”, “has”, “with”, or variants thereof are used in either the detailed description and the claims, such terms are intended to be inclusive in a similar manner to the term “comprising.”

A person of skill in the art of reclaiming and resins would appreciate that cannabis reclaim is distinct from resin formed with a traditional flower consumption. According to one embodiment and aspect of the invention, the apparatus can be used with respect to capturing resins from consumption of traditional flowers.

Figure 1:
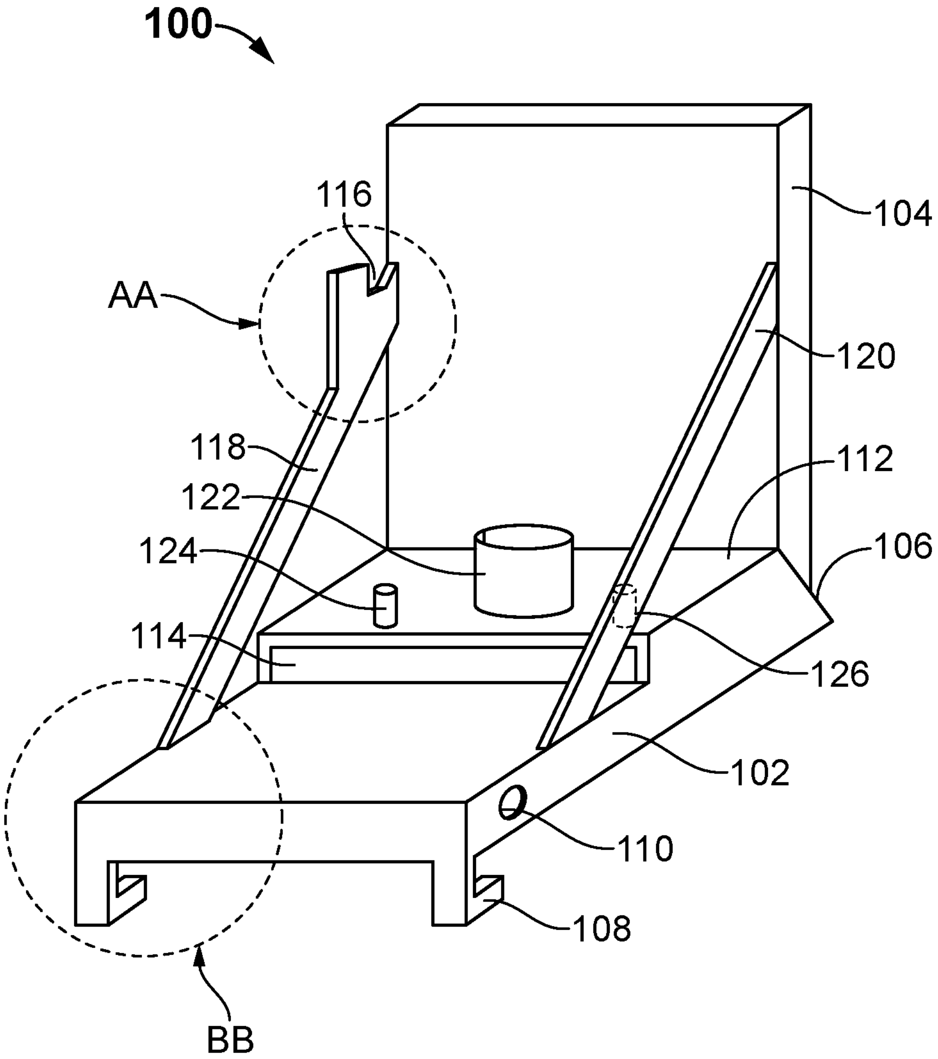
FIG. 1 shows an apparatus for removing reclaim from a cannabis consumption utensil, in accordance with various aspects and embodiments of the invention.

Referring to FIG. 1, shown is an apparatus 100 for removing reclaim from a cannabis consumption utensil, in accordance with various aspects and embodiments of the invention. Reclaim may be removed by placing one or more cannabis consumption utensils in the apparatus 100 such that the reclaim can drain into the apparatus, placing the apparatus 100 in an oven, and heating the apparatus 100 to cause the reclaim in the cannabis consumption utensil to liquefy and drain into the apparatus 100. According to one or more embodiments of the invention, reclaim may be removed by placing apparatus 100 in an oven and placing one or more cannabis consumption utensils in the apparatus 100 such that the reclaim can drain into the apparatus, and heating the apparatus 100 to cause the reclaim in the cannabis consumption utensil to liquefy and drain into the apparatus 100.

Base 102 provides a foundation for the apparatus 100. Backing 104 forms an angle with the distal end of base 102. According to one or more embodiments of the invention, base 102 and backing 104 form a 90-degree angle.

Wedge 106 provides anti-tipping and horizontal stability for the apparatus 100. In accordance with some embodiments of the invention, wedge 106 is formed as part of base 102. In accordance with some embodiments of the invention, wedge 106 is a separate part attached to base 106. According to one or more embodiments of the invention, wedge 106 may be any shape that is capable of providing additional stability to the distal end of base 102. For a non-limiting example, the wedge 106 may be in the shape of an arch that intersects the bottom of base 102.

One or more clips 108 are attached to the proximal end of base 102. One or more clips 108 allows the apparatus 100 to engage an edge portion of an oven rack to provide stability to the apparatus 100. An additional benefit of clip 108 may be to limit the depth the apparatus 100 may be inserted into the oven. According to one or more embodiments of the invention, the base 102 may have a pair of holes 110, one on each side or sidewall of the base 102. The pair of holes 110 are aligned and are centered on the same axis. The pair of holes 110 can receive a counterweight. The insertion of the counterweight helps to counteract tipping of the apparatus 100, such as when the apparatus 100 is resting on a surface, such as a table, with a utensil resting therein. According to one or more embodiments of the invention, the counterweight hole may be used as an attachment point for additional accessories which can support one or more cannabis consumption utensils. Brace 118 provides support for backing 104 by attaching to base 102.

Brace 118 has notch 116 to support one or more cannabis consumption utensils. According to one or more embodiments of the invention, brace 118 has two or more notches 116. According to one or more embodiments of the invention, the apparatus 100 has brace 120 attached between base 102 and backing 104 on the opposite side of brace 118. According to one or more embodiments of the invention, brace 120 has one or more notches 116.

Base 102 includes shelf 112 and includes an opening for containment tray 114. Containment tray 114 may be inserted and removed from apparatus 100. A receiving apparatus or accessory reducer tube 122 is attached to shelf 112 and is configured to drain into containment tray 114. Main accessory reducer tube 122 may be tapered. Tapering may keep cannabis consumption utensils from falling into the containment tray 114 and/or direct the flow of reclaim. When the apparatus 100 is heated in an oven, reclaim may liquefy and drain from the cannabis consumption utensil through the main accessory reducer tube 122 to containment tray 114. According to one or more embodiments of the invention, main accessory reducer tube 122 can be any shape configured to allow reclaim to flow from a cannabis consumption utensil to a containment tray. According to one or more embodiments of the invention, shelf 112 may collect reclaim. According to one or more embodiments of the invention, the shelf 112 may be concave in one or more locations to allow collection of reclaim. For example, when a cannabis consumption utensil has two or more openings that reclaim can drain from, the first opening may drain in a tube (e.g., main accessory reducer tube 122, accessory tube 124, accessory tube 126, etc.) and the second opening may drain onto the shelf. After reclamation is complete, the user may tip the device to remove the reclaim on shelf 112. According to one or more embodiments of the invention, shelf 112 may have one or more openings configured to drain reclaim into the drawer 114. According to one or more embodiments of the invention, containment tray 114 is built into the apparatus 100 and the user removes reclaim after reclamation is complete by tipping apparatus 100.

According to one or more embodiments of the invention, shelf 112 includes accessory tube 124 to provide an additional location to remove reclaim for a cannabis consumption utensil. According to one or more embodiments of the invention, accessory tube 124 is a fixed diameter tube. According to one or more embodiments of the invention, accessory tube 124 is tapered. According to one or more embodiments of the invention, accessory tube 124 can be any shape configured to allow reclaim to flow from a cannabis consumption utensil to a containment tray.

According to one or more embodiments of the invention, shelf 112 includes accessory tube 126 to provide an additional location to remove reclaim for a cannabis consumption utensil. According to one or more embodiments of the invention, accessory tube 126 is a fixed diameter tube. According to one or more embodiments of the invention, accessory tube 126 is tapered. According to one or more embodiments of the invention, accessory tube 126 can be any shape configured to allow reclaim to flow from a cannabis consumption utensil to a containment tray.

According to one or more embodiments of the invention, two or more cannabis consumption utensils may be placed in apparatus 100 and reclaim removed from each cannabis consumption utensil.

According to one or more embodiments of the invention, apparatus 100 is manufactured with a material that has a high shore durometer rated to support one or more cannabis consumption utensils while remaining stable. According to one or more embodiments of the invention, base 102 and/or back 104 is manufactured with a material that has a high shore durometer rated to support one or more cannabis consumption utensils while remaining stable. According to one or more embodiments of the invention, wedge 106 may be made of a solid material. According to one or more embodiments of the invention, counterweight hole 110 has a counterweight installed that is made of ceramic, quarts, titanium, or other heat resistance material.

Figure 2:
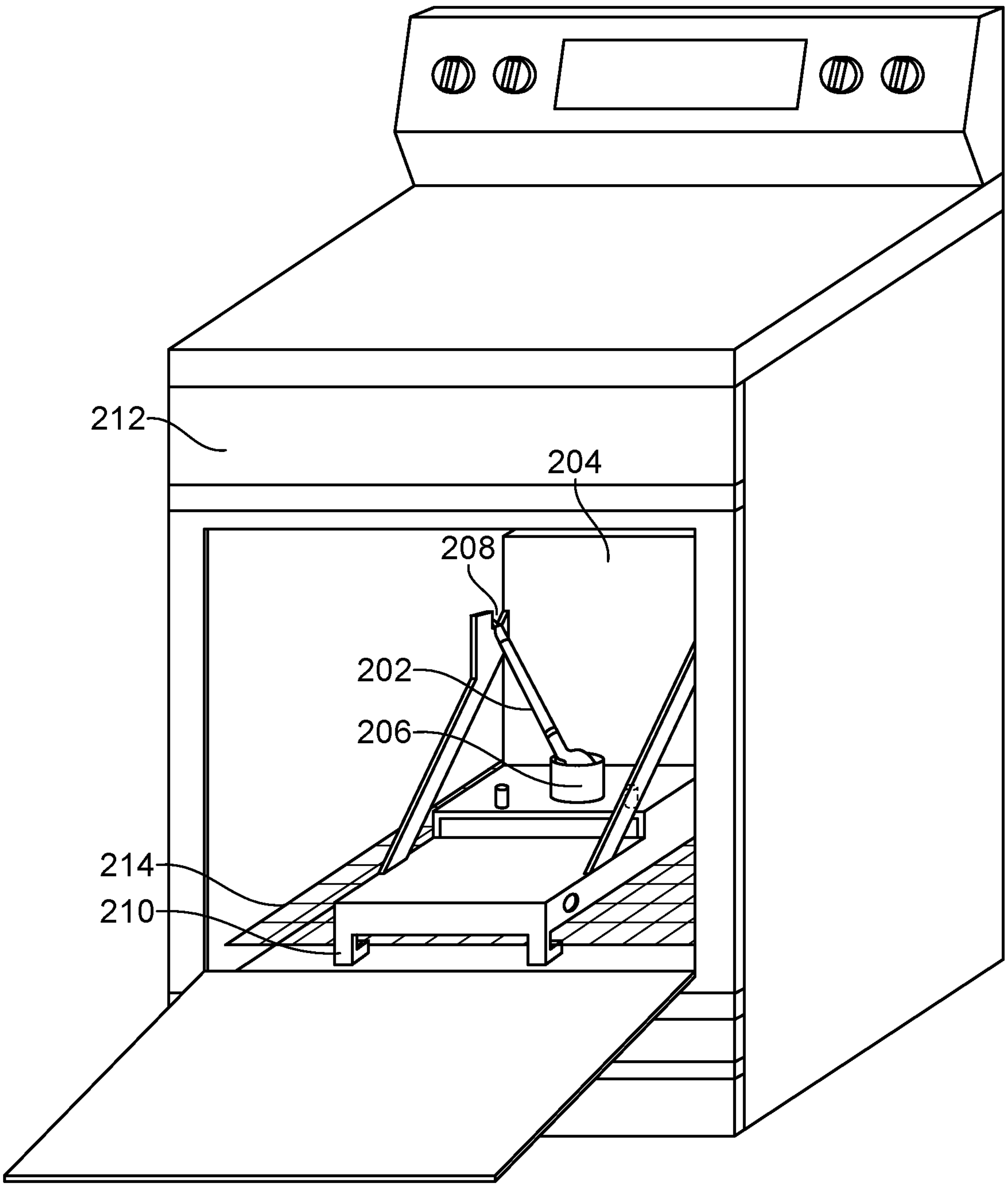
FIG. 2 shows an apparatus for removing reclaim from a cannabis consumption utensil being used in an oven, in accordance with various aspects and embodiments of the invention.

Referring to FIG. 2, shown is an apparatus for removing reclaim from a cannabis consumption utensil being used in an oven, in accordance with various aspects and embodiments of the invention. Cannabis consumption utensil 202 is placed in cannabis reclaim extraction device 204 in such a way as to allow reclaim to drain from cannabis consumption utensil 202 into cannabis reclaim extraction device 204 when the reclaim is heated. According to one or more embodiments of the invention, cannabis consumption utensil 202 is placed in a main accessory reducer tube 206 and supported by notch 208. According to one or more embodiments of the invention, cannabis reclaim removal device 204 may be the same or similar to apparatus 100. According to one or more embodiments of the invention, cannabis reclaim extraction device 204 is configured to be used with household ovens. According to one or more embodiments of the invention, cannabis reclaim extraction device 204 is configured to accept one or more of titanium, ceramic, quartz and silicon cannabis consumption utensil, nails, domes, down stems, reclaimers, nectar collectors, min dab rigs, etc.

According to one or more embodiments of the invention, Cannabis reclaim extraction device 204 is placed on oven rack 214 of oven 212. One or more oven clips 210 will attach to oven rack 214. The oven door is closed and the heat of the oven is turned on. As the oven 212 heats up, the reclaim may liquefy and drain into cannabis reclaim extraction device 204. Once cannabis reclamation is completed, the oven is turned off. According to one or more embodiments of the invention, reclamation is complete when reclaim is no longer flowing from the cannabis consumption utensil 202 to cannabis reclaim extraction device 204. According to one or more embodiments of the invention, after cannabis reclaim extraction device 204 has cooled to a temperature sufficient for handling by a user, the user may remove the reclaim from cannabis reclaim extraction device 204. According to one or more embodiments of the invention, the oven heat may be configured for the lowest heat setting (e.g., 170 degrees or less). According to one or more embodiments of the invention, collecting reclaim can take between ten and fifteen minutes depending on the size of the cannabis consumption utensil and/or the amount of reclaim in the cannabis consumption utensil. According to one or more embodiments of the invention, reclaim extraction device 204 is manufactured out of a high temperature material that meet shore durometer requirements for stability (e.g., high temperature silicone, high temperature epoxy, high temperature plastic, high temperature bonded silicone metal, etc.).

Figure 3A:
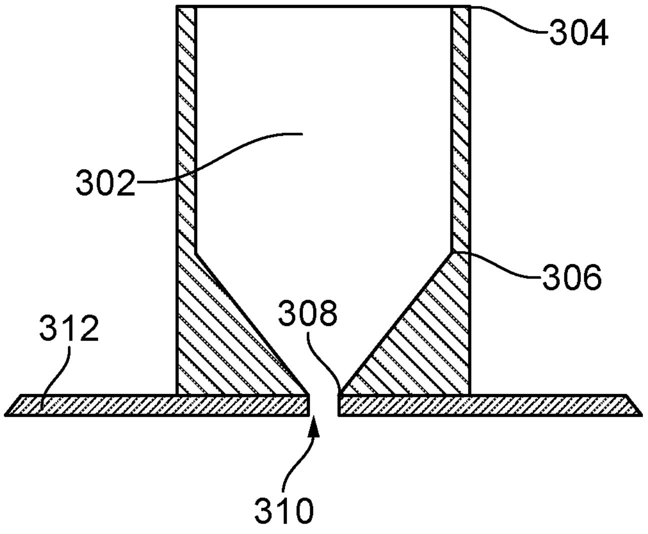
FIG. 3A shows a cross section view of a main accessory reducer tube, in accordance with various aspects and embodiments of the invention.

Referring to FIG. 3A, shown is a cross section view of a main accessory reducer tube, in accordance with various aspects and embodiments of the invention. Main accessory reducer tube 302 begins at beginning 304 with a fixed diameter. At taper start 306, the main accessory reducer tube 302 begins to taper toward the center of the main accessory reducer tube 302. At taper end 308, the main accessory reducer tube 302 ends tapering and continues with a fixed diameter that is maintained until the ending 310. Main accessory reducer tube 302 attaches to shelf 312. According to one or more embodiments of the invention, shelf 312 may be the same or similar to shelf 112. According to one or more embodiments of the invention, a cannabis consumption utensil is placed in main accessory reducer tube 302. According to one or more embodiments of the invention, a containment tray is placed under ending 310. When a cannabis consumption utensil is placed in main accessory reducer tube 302 and heated, reclaim present in the cannabis consumption utensil may liquefy and drain into the containment tray. According to one or more embodiments of the invention, main accessory reducer tube 302 may be the same or similar to main accessory reducer tube 122. According to one or more embodiments of the invention, accessory reducer tube 302 and shelf 312 may be molded as a single unit. According to one or more embodiments of the invention, shelf 312 has an opening wide enough to accept the outer diameter of accessory reducer tube 302. According to one or more embodiments of the invention, main accessory reducer tube 302 is manufactured with a medium shore durometer material.

Figure 3B:
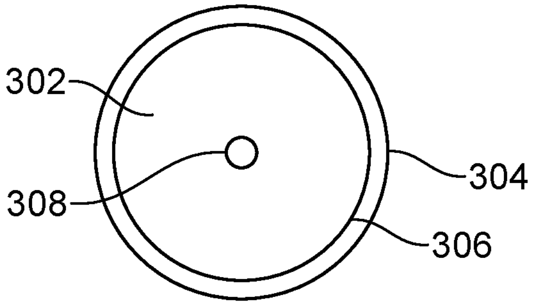
FIG. 3B shows a top view of a main accessory reducer tube, in accordance with various aspects and embodiments of the invention.

Referring to FIG. 3B, shown is a top view of a main accessory reducer tube, in accordance with various aspects and embodiments of the invention. Main accessory reducer tube 302 begins at beginning 304 and starts tapering at taper start 306. Tapering ends at taper end 308.

Figure 3C:
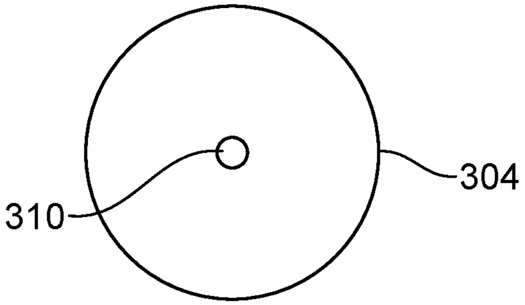
FIG. 3C shows a bottom view of a main accessory reducer tube, in accordance with various aspects and embodiments of the invention.

Referring to FIG. 3C, shown is a bottom view of a main accessory reducer tube, in accordance with various aspects and embodiments of the invention. Main accessory reducer tube 302 begins at beginning 304 and ends at ending 310.

Figure 4A:
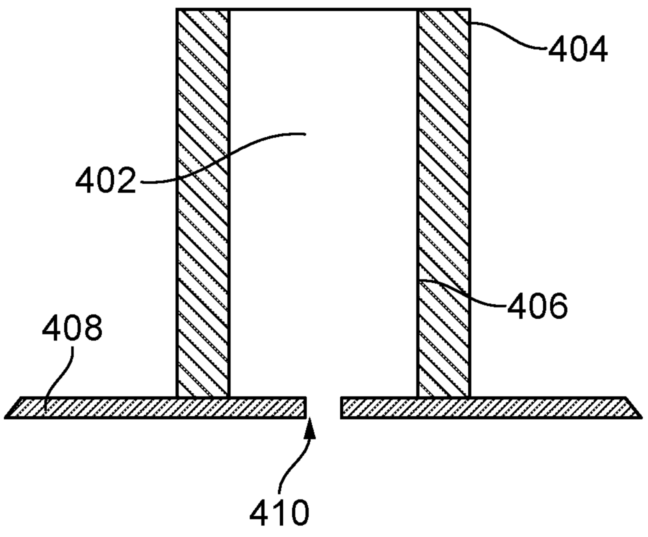
FIG. 4A shows a cross section view of an accessory tube, in accordance with various aspects and embodiments of the invention.

Referring to FIG. 4A, shown is a cross section view of an accessory tube, in accordance with various aspects and embodiments of the invention. Accessory tube 402 is connected to shelf 408. Accessory tube 402 has outer wall 404, inner wall 406, and opening 410. According to one or more embodiments of the invention, shelf 408 may be the same or similar to shelf 112. According to one or more embodiments of the invention, a cannabis consumption utensil is placed in accessory tube 402. According to one or more embodiments of the invention, a containment tray is placed under accessory tube 402. When a cannabis consumption utensil is placed in accessory tube 402 and heated, reclaim present in the cannabis consumption utensil may liquefy and drain into the containment tray. According to one or more embodiments of the invention, multiple accessory tube 402 may be attached to shelf 408. According to one or more embodiments of the invention, accessory tube 402 may be the same or similar to accessory tube 124. According to one or more embodiments of the invention, accessory tube 402 may be the same or similar to accessory tube 126. According to one or more embodiments of the invention, accessory tube 402 is manufactured with a medium shore durometer material.

Figure 4B:
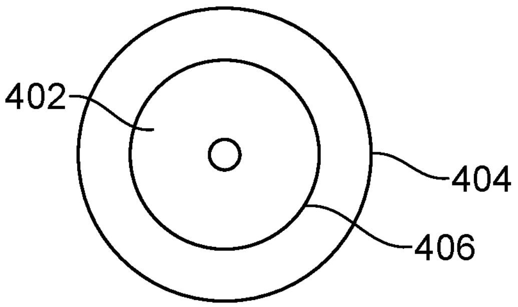
FIG. 4B shows a top view of an accessory tube, in accordance with various aspects and embodiments of the invention.
Figure 4C:
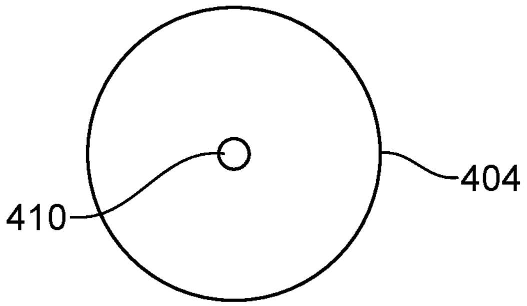
FIG. 4C shows a bottom view of an accessory tube, in accordance with various aspects and embodiments of the invention.

Referring to FIG. 4B, shown is a top view of an accessory tube, in accordance with various aspects and embodiments of the invention. Accessory tube 402 has outer wall 404, and inner wall 406.

Referring to FIG. 4B, shown is a bottom view of an accessory tube, in accordance with various aspects and embodiments of the invention. Accessory tube 402 has outer wall 404 and opening 410.

Figure 5:
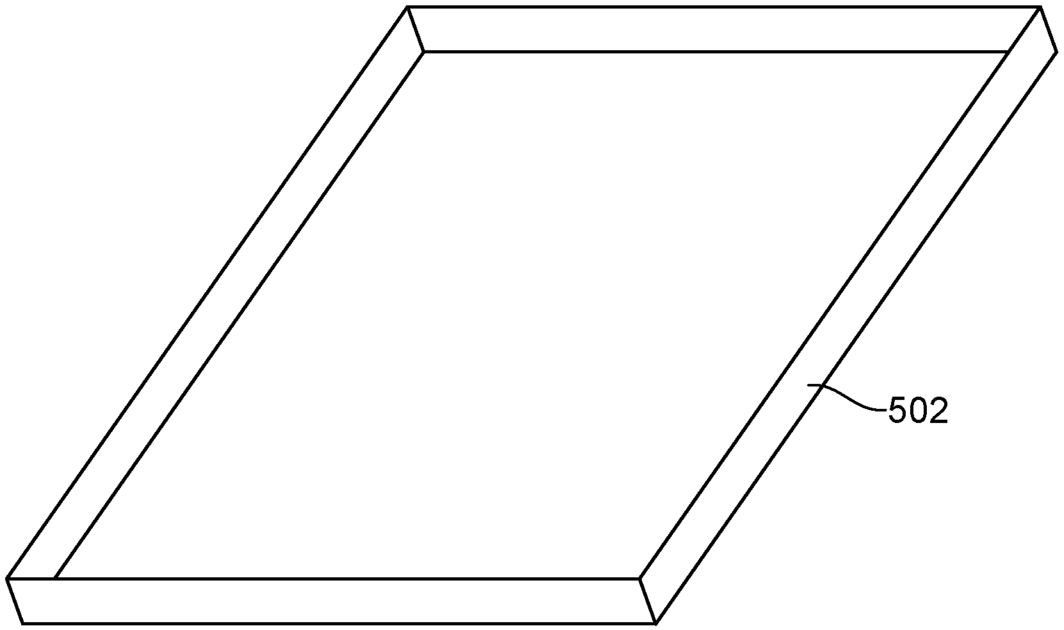
FIG. 5 shows a containment tray, in accordance with various aspects and embodiments of the invention.

Referring to FIG. 5, shown is a containment tray used in a cannabis reclaim extraction device, in accordance with various aspects and embodiments of the invention. Containment tray 502 is placed underneath tubes (e.g., main accessory reducer tube 122, accessory tube 124, accessory tube 126, etc.) to collect reclaim. According to one or more embodiments of the invention, containment tray 502 may contain an attachment (e.g., handle, knob, cut out, etc.) to aid the user in removing the containment tray 502 from the cannabis reclaim extraction device. According to one or more embodiments of the invention, containment tray 502 may be any shape configured to receive reclaim.

Figure 6:
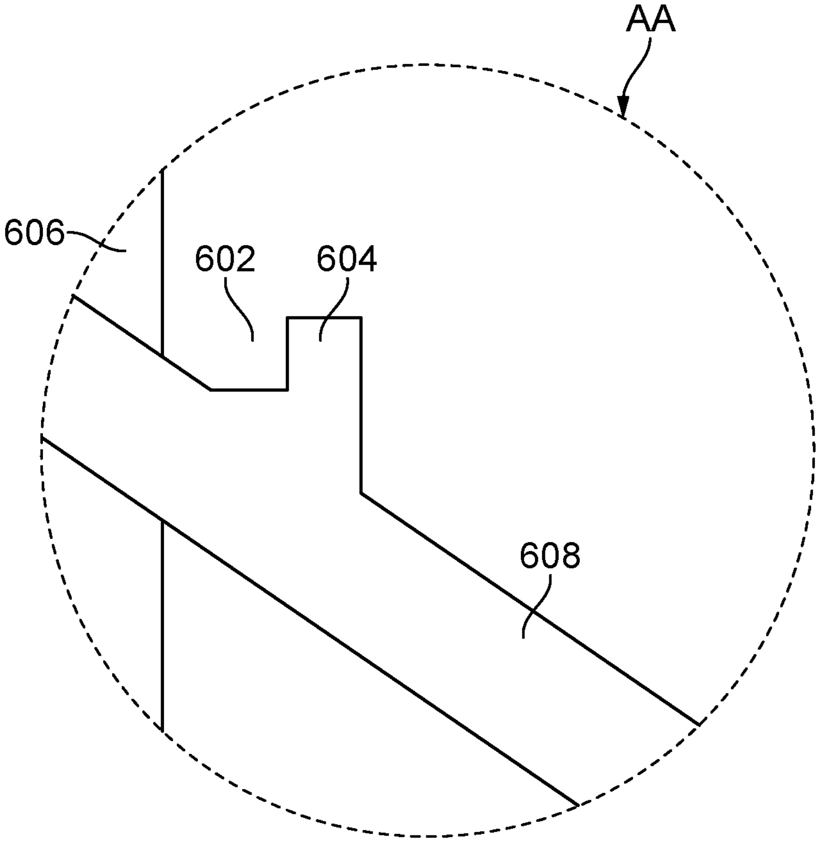
FIG. 6 shows a notch to support a cannabis consumption utensil, in accordance with various aspects and embodiments of the invention.

Referring to FIG. 6, shown is a notch to support a cannabis consumption utensil, in accordance with various aspects and embodiments of the invention. Brace 608 is connected to backing 606. Notch 602 is formed between vertical stop or tooth 604 and backing 606. According to one or more embodiments of the invention, a cannabis consumption utensil is supported by notch 602 while the other end of the cannabis consumption utensil is resting in a tube (e.g., main accessory reducer tube 122, accessory tube 124, accessory tube 126, etc.). According to one or more embodiments of the invention, notch 602 is created by removing part of brace 608. According to one or more embodiments of the invention, notch 602 may be located at any part of the brace 608. According to one or more embodiments of the invention, brace 608 may have one or more notches 602.

Figure 7:
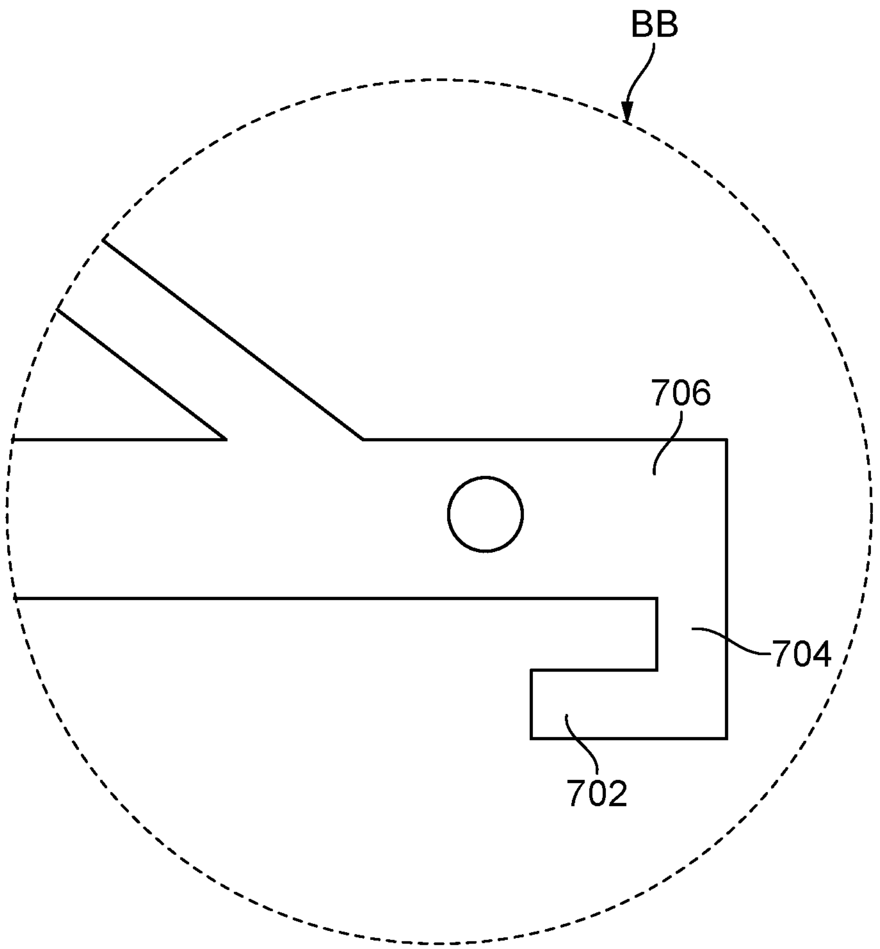
FIG. 7 shows an oven clip, in accordance with various aspects and embodiments of the invention.

Referring to FIG. 7, shown is an oven clip, in accordance with various aspects and embodiments of the invention. Clip 702, stop 704, and base 706 form a structure to connect with an oven rack. Clip 702 and stop 704 are sized to couple base 706 to an oven rack. According to one or more embodiments of the invention, clip 702 may be the same or similar to clip 108. According to one or more embodiments of the invention, base 706 may be the same or similar to base 102. According to one or more embodiments of the invention, clip 702 and stop 704 may be flexible and adjusted to fit an oven rack.

Figure 8A:
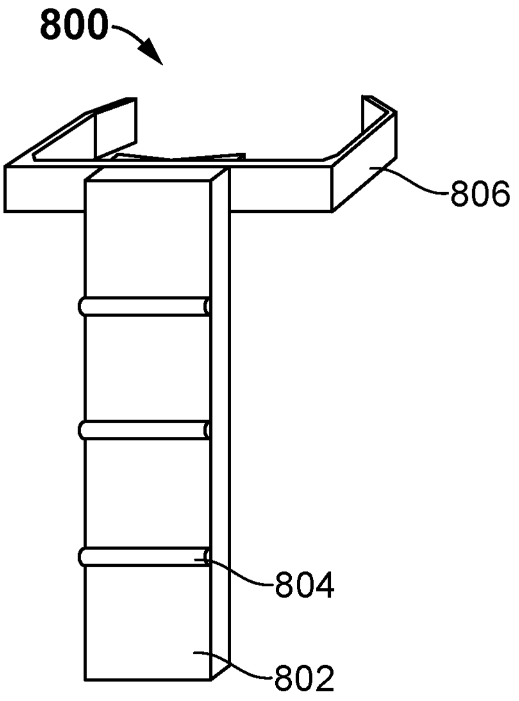
FIG. 8*a* shows an upper accessory, in accordance with various aspects and embodiments of the invention.

Referring to FIG. 8*a*, shown is an upper accessory 800, in accordance with various aspects and embodiments of the invention. Upper accessory backing 802 may contain one or more slide stops 804. Slide stop 804 may enable the position of the upper accessory 800 position to be maintained when inserted into a cannabis reclaim extraction device. Accessory backing 802 has arm 806. Arm 806 may be used to support a cannabis consumption utensil. According to one or more embodiments of the invention, upper accessory 800 has two or more arms 806. According to one or more embodiments of the invention, arm 806 is an arch. According to one or more embodiments of the invention, arm 806 contains multiple segments to create the arm 806. According to one or more embodiments of the invention, a cannabis consumption utensil is supported by one or more arms 806 while the other end of the cannabis consumption utensil is resting in a tube (e.g., main accessory reducer tube 122, accessory tube 124, accessory tube 126, etc.). According to one or more embodiments of the invention, upper accessory 800 is manufactured with a high shore durometer rating allowing rigidity.

Figure 8B:
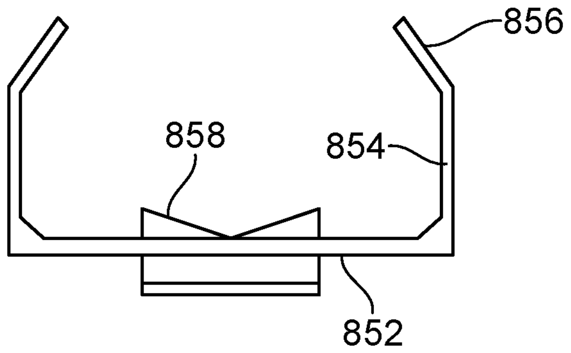
FIG. 8*b* shows an upper accessory from the top view, in accordance with various aspects and embodiments of the invention.

Referring to FIG. 8*b*, shown is an upper accessory 800 from the top view, in accordance with various aspects and embodiments of the invention. Arm 806 includes base arm 852 connected to mid arm 854 connected to arm tip 856. According to one or more embodiments of the invention, base arm 852, mid arm 854, and arm tip 856 are flexible allowing the user to configure the arm for a cannabis consumption utensil. According to one or more embodiments of the invention, upper accessory 800 includes a V-block (V-notch) portion or stop 858 for stabilizing and reducing the roll and movement of a cannabis consumption utensil and to provide support for a cannabis consumption utensil. A possible benefit of cannabis consumption utensil stop 858 is to keep a cannabis consumption utensil from rolling. According to one or more embodiments of the invention, the angle between mid-arm 854 and arm tip 856 is in the range of 45 degrees to 20 degrees relative to the mid-arm 854.

Figure 9:
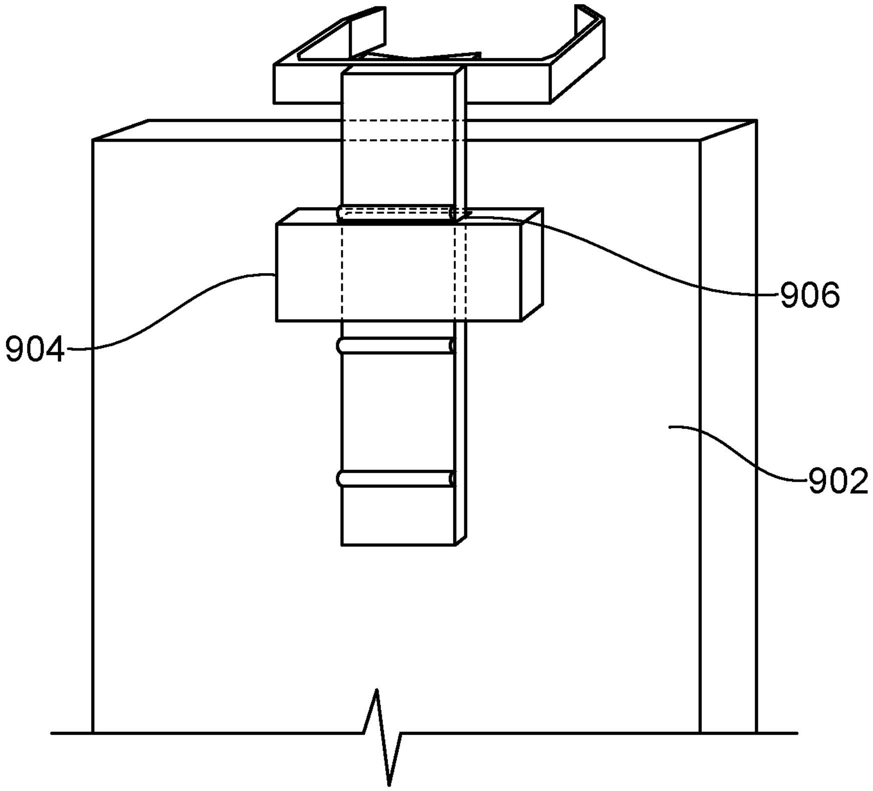
FIG. 9 shows an upper accessory notched attachment, in accordance with various aspects and embodiments of the invention.

Referring to FIG. 9, shown is an upper accessory attachment, in accordance with various aspects and embodiments of the invention. A receiving notch 904 is attached to a back portion of back 902. Receiving notch 904 accepts upper accessory device 906. Upper accessory device 906 may be the same or similar to upper accessory 800. According to one or more embodiments of the invention, base 902 is the same or similar to base 104. According to one or more embodiments of the invention, upper accessory 906 height may be adjusted, as needed, to match the height of and to securely hold a cannabis consumption utensil.

The scope of the invention, therefore, is not intended to be limited to the exemplary embodiments shown and described herein. Rather, the scope and spirit of present invention is embodied by the appended claims.

What is claimed is:

1. A cannabis reclaim removal device comprising:

a base having a proximal end and a distal end;

a back having a front portion and a back portion, the back is attached to the distal end of the base;

at least one rack clip on the proximal end of the base extending in an opposite direction from the back;

a wedge at the distal end of the base, wherein the wedge extends beyond the back to provide horizontal stability to the base;

a brace having one end attached to the base and an opposite end attached to the back, wherein the brace includes a notch to support a cannabis consumption utensil;

a shelf attached to the distal end of the base and on a top surface of the base, wherein the shelf defines a cavity on one side of the shelf for receiving a containment tray and the shelf defines a hole on an upper surface of the shelf; and at least one receiving apparatus attached to the upper surface of the shelf, wherein the receiving apparatus is configured to direct cannabis reclaim, which drains from the cannabis consumption utensil, into the containment tray.

2. The cannabis reclaim removal device of claim 1, wherein the at least one receiving apparatus is tapered.

3. The cannabis reclaim removal device of claim 1, wherein the at least one receiving apparatus has a portion that has a fixed diameter and a portion that is tapered.

4. The cannabis reclaim removal device of claim 1, wherein the at least one receiving apparatus has a fixed diameter.

5. The cannabis reclaim removal device of claim 1 further comprising a second receiving apparatus, wherein the receiving apparatus is tapered the second receiving apparatus has a fixed diameter.

6. The cannabis reclaim removal device of claim 1, wherein an angle formed between the base and the back is 90 degrees.

7. The cannabis reclaim removal device of claim 1, wherein the proximal end of the base defines a pair of holes on opposite sidewall of the base, the pair of holes being aligned on an axis, such that the pair of holes can receive a counterweight.

8. The cannabis reclaim removal device of claim 7, wherein the counterweight is inserted through in the pair of holes.

9. The cannabis reclaim removal device of claim 7, wherein the pair of holes are used to attach another accessory that acts as a support.

10. The cannabis reclaim removal device of claim 1 further comprising:

a receiving notch attached to the back portion of the back; and an upper device for supporting the cannabis consumption utensil, wherein the upper device is inserted in to the receiving notch.

11. The cannabis reclaim removal device of claim 10, wherein the upper device includes one or more slide stops.

12. The cannabis reclaim removal device of claim 10, wherein the upper device includes flexible arms that are adjustable.

13. The cannabis reclaim removal device of claim 10, wherein the upper device includes a v-block notch.

14. The cannabis reclaim removal device of claim 1, wherein an angle between the base and the back is greater than zero degrees and less than 180 degrees.

15. The cannabis reclaim removal device of claim 1, wherein the containment tray is formed to collect reclaim when the containment tray is inserted into the shelf.

16. The cannabis reclaim removal device of claim 15, wherein the shelf defines at least one opening on the top surface to allow reclaim present on the top surface of the shelf to drain into the containment tray.

* * * * *